United States Patent
Antony Prince et al.

(10) Patent No.: US 11,117,100 B2
(45) Date of Patent: Sep. 14, 2021

(54) HYDROPHILIC POLYMER AND MEMBRANE FOR OIL-WATER SEPARATION AND METHOD OF PRODUCING THE SAME

(71) Applicant: NGEE ANN POLYTECHNIC, Singapore (SG)

(72) Inventors: James Selvaraj Antony Prince, Singapore (SG); Sowrirajalu Bhuvana, Singapore (SG); Vanangamudi Anbharasi, Singapore (SG); Gurdev Singh, Singapore (SG); Pandurangan Mohan, Singapore (SG); Ramalingam Balamurugan, Singapore (SG)

(73) Assignee: NGEE ANN POLYTECHNIC, Singapore (SG)

( * ) Notice: Subject to any disclaimer, the term of this patent is extended or adjusted under 35 U.S.C. 154(b) by 252 days.

(21) Appl. No.: 16/475,250

(22) PCT Filed: Jan. 18, 2017

(86) PCT No.: PCT/SG2017/050024
§ 371 (c)(1),
(2) Date: Jul. 1, 2019

(87) PCT Pub. No.: WO2018/135999
PCT Pub. Date: Jul. 26, 2018

(65) Prior Publication Data
US 2019/0329184 A1  Oct. 31, 2019

(51) Int. Cl.
*B01D 69/02* (2006.01)
*B01D 61/14* (2006.01)
(Continued)

(52) U.S. Cl.
CPC .......... *B01D 69/02* (2013.01); *B01D 61/145* (2013.01); *B01D 67/0011* (2013.01);
(Continued)

(58) Field of Classification Search
CPC .. B01D 69/02; B01D 61/145; B01D 67/0011; B01D 69/08; B01D 71/42; B01D 71/44;
(Continued)

(56) References Cited

U.S. PATENT DOCUMENTS 4,604,422 A   8/1986  Younes

OTHER PUBLICATIONS

Liu, Y. et al., 'Fabrication and performance study of a zwitterionic polyimide antifouling ultrafiltration membrane', RSC Advances, 2015, vol. 5, pp. 21316-21325, Abstract, sections 2.4, Fig. 1.
(Continued)

*Primary Examiner* — Krishnan S Menon
(74) *Attorney, Agent, or Firm* — Pearl Cohen Zedek Latzer Baratz LLP

(57) ABSTRACT

This invention relates to a hydrophilic polymer and membrane for oil-water separation. More particularly, this invention relates to a super hydrophilic polymer and membrane with zwitterionic property for oil-water separation, and method of producing the same. The hydrophilic polymer comprises polymer repeat units, each unit having at least one negatively charged carboxylic functional group and at least one positively charged amine functional group; and a monomer having a single aromatic ring and an imide functional group.

17 Claims, 11 Drawing Sheets

(51) Int. Cl.
| | |
|---|---|
| *B01D 67/00* | (2006.01) |
| *B01D 69/08* | (2006.01) |
| *B01D 71/42* | (2006.01) |
| *B01D 71/44* | (2006.01) |
| *B01D 71/64* | (2006.01) |
| *B01D 71/68* | (2006.01) |
| *B01D 71/76* | (2006.01) |
| *C08F 222/06* | (2006.01) |
| *C08F 222/30* | (2006.01) |
| *C08F 222/40* | (2006.01) |

(52) U.S. Cl.
CPC .............. *B01D 69/08* (2013.01); *B01D 71/42* (2013.01); *B01D 71/44* (2013.01); *B01D 71/64* (2013.01); *B01D 71/68* (2013.01); *B01D 71/76* (2013.01); *C08F 222/06* (2013.01); *C08F 222/30* (2013.01); *C08F 222/40* (2013.01); *B01D 2325/18* (2013.01); *B01D 2325/36* (2013.01); *C08F 222/404* (2020.02)

(58) Field of Classification Search
CPC ........ B01D 71/64; B01D 71/68; B01D 71/76; B01D 2325/18; B01D 2325/36; B01D 71/60; B01D 71/40; C08F 222/06; C08F 222/30; C08F 222/40; C08F 222/404
See application file for complete search history.

(56) References Cited

OTHER PUBLICATIONS

Prince, J. A. et al., 'Ultra-wetting graphene-based Pes ultrafiltration membrane—A novel approach for successful oil-water separation', Water Research, Jul. 19, 2016, vol. 103, pp. 311-318 Abstract, Fig. 3.

HYDROPHILIC POLYMER AND MEMBRANE FOR OIL-WATER SEPARATION AND METHOD OF PRODUCING THE SAME

CROSS-REFERENCE TO RELATED APPLICATIONS

This application is a National Phase Application of PCT International Application No. PCT/SG2017/050024, International Filing Date Jan. 18, 2017, which is hereby incorporated by reference.

FIELD OF THE INVENTION

This invention relates to a hydrophilic polymer and membrane for oil-water separation. More particularly, this invention relates to a super hydrophilic polymer and membrane with zwitterionic property for oil-water separation, and method of producing the same.

BACKGROUND

Produced water, which is water that is produced as a by-product along with the oil and gas in the petroleum industry, is generated at various stages of the production and refining processes of the oil and gas. In the production phase, at least three barrels of produced water can be generated for every corresponding barrel of oil refined per day. This ratio increases as oil wells mature and it may reach 7 to 10 barrels a day, especially in mature oil fields. Given the actual oil production in 2011 (72,560,000 bbl/d) (B. Bailey et al., "Water Control", Oilfield Review 12, pp. 30-51, 2000), and the minimum ratio of 3 barrels of produced water against each barrel of oil produced, a minimum of 217,680,000 bbl/d of produced water was generated in 2011 (S. Alzahrani et al., "Comparative study of NF and RO membranes in the treatment of produced water—Part I: Accessing water quality", Desalination, 315 (1-2), pp. 18-26, 2013). Currently, the total volume of produced water from upstream and downstream processes in the petroleum industry exceeds 437 million barrels per day, wherein only less than 1% is recycled for the purpose of reuse. By 2035, the demand for oil is anticipated to reach 110 million bbl/d (Organization of the Petroleum Exporting Countries (OPEC), World Oil Outlook 2011, OPEC, Vienna, 2011), which implies that the volume of water produced in the industry will exceed 605 million bbl/d. Compared with 66.4 million $m^3$ of potable water generated every day from the desalination industry (T. Pankratz, et al., IDA Desalination Yearbook 2011-2012, Media Analytics Ltd., Oxford, UK, 2011), a similar percentage (77.3%) of volume of the produced water (which amounts to 51.36 million $m^3$) is generated and discharged daily from the petroleum industry. The rate of disposal of such water (which meets environmental discharge regulations) does not match-up to the required rate of natural water replenishment. This may result in significant depletion of water resources in the near future.

Discharge of untreated petroleum refining wastewater into bodies of water results in adverse environmental and human health effects due to the release of toxic contaminants such as hydrocarbons, phenol and dissolved minerals. The permitted oil and grease (O&G) limits for treated produced water discharge offshore in, for example, Singapore is 60 mg/L (Hydrocarbon) and 100 mg/L (Non-hydrocarbon). Based on United States Environmental Protection Agency (USEPA) regulations, the daily maximum limit for O&G is 42 mg/L and the monthly average limit is 29 mg/L. Conventional wastewater treatment technologies such as coagulation, flocculation, gravity separation and air flotation normally cannot meet the high purity requirements for discharge of oily wastewater because these technologies are not effective in removing smaller oil droplets and emulsions.

There is a growing tendency to use membrane technology for oily wastewater treatment. Distinct advantages of membrane technology for treatment of oily wastewater include reduced sludge, high quality permeates and the possibilities of closed loop recycled water systems. Although membranes can treat oily wastewater, their widespread use is hindered by a decline in permeate flux experienced as a result of fouling. Different types of physical and chemical cleaning have been recommended. However, the harsh treatment procedures can damage the membrane and shorten its life span. Membrane materials are sensitive; therefore, preventing the attachment of organics onto the membrane surface is far more important than cleaning the membrane that had already fouled.

Currently, there are two different types of membrane that are in use for oil-water separation based on their surface properties. The first type is the superhydrophobic-superoleophilic membrane. This type of membrane is favourable for oil transportation while repelling the liquid water entering the pores. Examples of such membrane include silicon oxy-carbide fibers membrane; PTFE coated mesh membrane; and modified polyester textile membrane. The pore size of these membranes is rationally controlled to be smaller than the emulsified water droplets and as such, these membranes could be used for effective oil-water separation.

The second type is the superhydrophilic-superoleophobic membrane. This type of membrane is favourable for water transportation while repelling the oil entering the pores. Examples of such membrane include aligned zinc oxide nanorod array coated mesh membrane; zeolite-coated mesh membrane; and hydrogel-coated mesh membrane.

An example of the second type of superhydrophilic-superoleophobic membrane is disclosed in US 2012/0000853, which provides a superhydrophilic and superoleophobic porous material for use in a separator device to separate a liquid-liquid mixture of immiscible components (e.g. oil and water) or miscible components (e.g. alcohols). Another example of such membrane is disclosed in WO 2012/148359 A1, which provides a highly hydrophilic and highly oleophobic membrane for oil-water separation.

The first type of superhydrophobic-superoleophilic membrane has several drawbacks such as the adherent of high viscous oil on the membrane surface. The oil adhered to the surface of the membrane generally is difficult to remove and this leads to more wastage in the oil, and higher usage of chemicals which will be required for removal of the oil on the membrane surface. The second type of superhydrophilic-superoleophobic membrane is advantageous over the first type of superhydrophobic-superoleophilic membrane. This is because the second type of superhydrophilic-superoleophobic membrane allows water to pass through, which reduces the possibility of membrane clogging. Similarly, such membrane prevents the formation of water barrier between the membrane surface and the oil phase due to the fact that water is heavier than oil phase. FIG. 1(b) shows how the water barrier affects the permeate flux in the first type of superhydrophobic-superoleophilic membrane. If the first type of superhydrophobic-superoleophilic membrane is used, then the system has to operate in a very high turbulent flow in order to allow the oil emulsion to move towards the membrane. This operation increases the energy consumption of the overall system.

Generally, hydrophilic membrane exhibits an affinity for water. It possesses a high surface tension value and has the ability to form hydrogen-bonds with water. Hydrophilic surface will repel the hydrophobic oily particles such as hydrocarbons, surfactants, greases, etc. Recently, considerable attention has been focused to improve the surface hydrophilicity of membranes along with generation of surface micro-nano structures for oil-water separations. This results in superoleophobic surfaces with low oil-adhesion.

Currently, most of the conventional polymeric ultrafiltration membranes are made up of polyethersulfone (PES) or polyvinylidene fluoride (PVDF). These two polymers are basically hydrophobic in nature. However, these materials are used for water filtration because of their high mechanical strength and chemical stability. In order for these membranes to be used for water filtration, modification to the materials of the membranes is required. Such modifications may include the addition of hydrophilic additives such as polyvinylpyrrolidone (PVP), polyethylene glycol (PEG) or the like to the materials. However, such modified membranes have their shortcomings. During harsh operating conditions and chemical (acid and alkaline) cleaning, these hydrophilic additives will dissolve in the solution and the membranes will revert to their original surface properties/chemistry by losing the surface energy. This results in the membrane losing its hydrophilicity gradually. Hence, in such membranes, the flux declines over time due to the adsorption and accumulation of rejected oil, suspended solids and other biological components (such as bacteria and fungi) on the surface of the membrane and in the membrane pores during the wastewater treatment process, due to hydrophobic attraction. This type of fouling can be irreversible or resistant to cleaning, thus making the original flux unrecoverable.

It is therefore desirable to provide a hydrophilic polymer and membrane that seeks to address at least one of the problems described hereinabove, or at least to provide an alternative.

SUMMARY OF INVENTION

In accordance with a first aspect of this invention, a hydrophilic polymer for membrane is provided. The hydrophilic polymer comprises polymer repeat units, each unit having at least one negatively charged carboxylic functional group and at least one positively charged amine functional group; and a monomer having a single aromatic ring and an imide functional group.

In accordance with a second aspect of this invention, a hydrophilic polymer-based membrane for oil-water separation is provided. The hydrophilic polymer-based membrane comprises a base polymer and a second polymer comprising polymer repeat units, each unit having at least one negatively charged carboxylic functional group and at least one positively charged amine functional group; and a monomer having a single aromatic ring and an imide functional group.

In accordance with one embodiment of this invention, the hydrophilic polymer-based membrane is a single-layer membrane. In accordance with other embodiment of this invention, the hydrophilic polymer-based membrane is a multilayer membrane with the second polymer forming a coating over the base polymer.

In accordance with one embodiment of this invention, the hydrophilic polymer-based membrane has a surface water contact angle between 5° and 50°. In accordance with other embodiments of this invention, the hydrophilic polymer-based membrane has an average pore size of 18 to 22 nm.

In accordance with a third aspect of this invention, a method of producing a hydrophilic polymer-based membrane is provided. The method comprises dissolving a monomer comprising a single aromatic ring and an imide functional group and a mixture containing maleic anhydride and diaminomaleonitrile in a solvent to obtain a solution; and thermal imidizing the solution to form a hydrophilic polymer for use in fabricating a hydrophilic polymer-based membrane with zwitterionic property.

In accordance with one embodiment of this invention, the method further comprises adding the hydrophilic polymer to a casting solution, and mixing the solution to obtain a homogeneous polymeric solution for use in fabricating the hydrophilic polymer-based membrane.

In accordance with one embodiment of this invention, the monomer is maleimido benzoic acid.

In accordance with one embodiment of this invention, the polymer repeat units having the general formula of

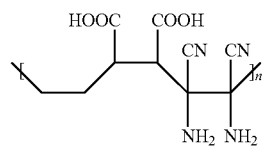

where n is an integer from 1 to about 25,000.

In accordance with one embodiment of this invention, the hydrophilic polymer is poly(maleimide benzoic acid-co-maleic acid-co-diaminomaleonitrile) having the formula:

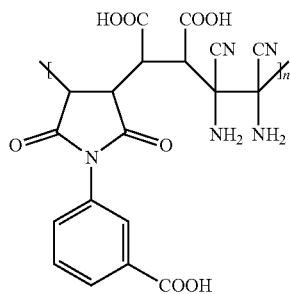

where n is an integer from 1 to about 25,000.

In accordance with one embodiment of this invention, the polymer repeat units constitute 30-50% by weight of the hydrophilic polymer with zwitterionic property.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a hydrophilic polymer and membrane for oil-water separation. More particularly, this invention relates to a hydrophilic polymer and membrane with zwitterionic property for oil-water separation.

The hydrophilic polymer of the present invention comprises polymer repeat units, each unit having at least one negatively charged carboxylic functional group and at least one positively charged amine functional group, and a monomer having a single aromatic ring and an imide functional group.

In one embodiment, each of the polymer repeat units is electronically neutral, having a net charge of substantially zero. This means that the polymer repeat unit has the same number of negatively charged carboxylic functional group and positively charged amine functional group. In one embodiment, each of the polymer repeat units comprises two negatively charged carboxylic functional group and two positively charged amine function group, having a general formula of:

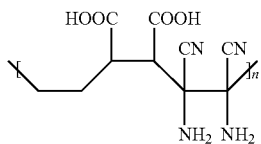

where n is an integer from 1 to 25,000.

In one embodiment, the polymer repeat unit is obtainable by reacting maleic anhydride monomer with diaminomaleonitrile.

The monomer used in the preparation of the hydrophilic polymer of the present invention comprises a single aromatic ring and an imide functional group. In one embodiment, the imide-based monomer is maleimido benzoic acid having the following structure:

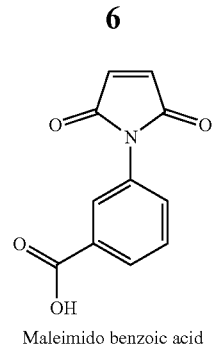

Maleimido benzoic acid

Figure 1A:
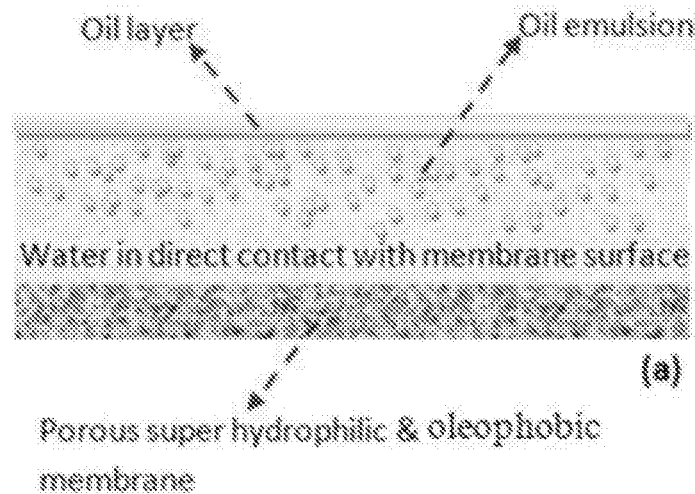
FIG. 1(a) illustrates a superhydrophilic-superoleophobic membrane in which water is in direct contact with the membrane surface according to prior art.
Figure 1B:
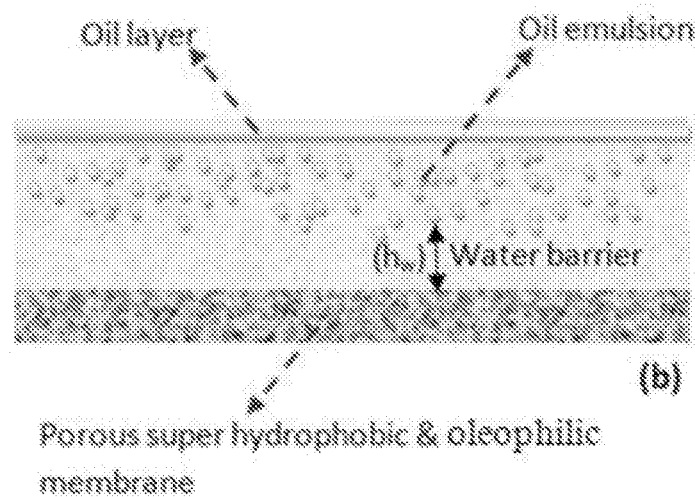
FIG. 1(b) illustrates the water barrier between the membrane surface and the oil emulsion in a superhydrophoic-superoleophilic membrane according to prior art.
Figure 2:
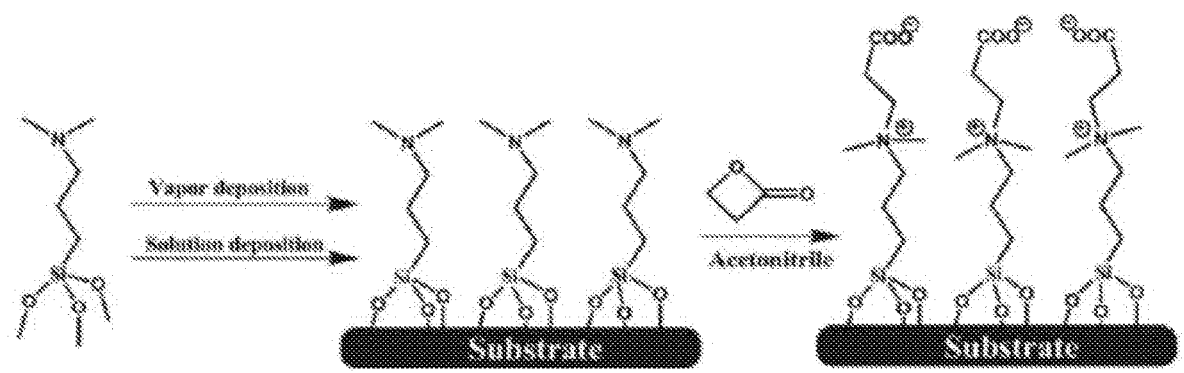
FIG. 2 shows a substrate attached with zwitterionic molecules according to prior art.
Figure 3:
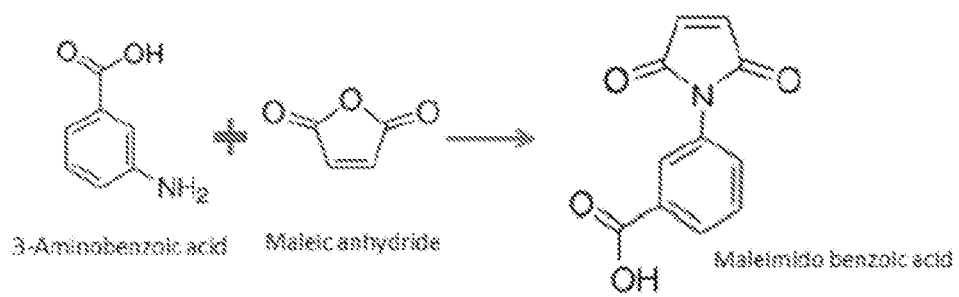
FIG. 3 illustrates a synthesis of imide-based monomer in accordance with an embodiment of the present invention.

FIG. 3 illustrates the synthesis of the maleimido benzoic acid. In this embodiment, the maleimido benzoic acid is synthesized by reacting 3-aminobenoic acid with maleic anhydride. Initially, the acid form of maleimido benzoic acid is formed by nucleophilic addition reaction between the amine group and the carboxyl group. Cyclization is then carried out either by chemical imidization under the action of, for example, acetic anhydride and trimethylamine, or by thermal imidization. In one embodiment, the molar ratio of 3-aminobenoic acid to maleic anhydride is 1:1. The monomer is thermally and chemically stable.

In accordance with an embodiment of the invention, the polymer repeat units constitute 30-50% by weight of the hydrophilic polymer with zwitterionic property.

In one embodiment, the hydrophilic polymer of the present invention is poly(maleimide benzoic acid-co-maleic acid-co-diaminomaleonitrile) (or "PMBMD" as used herein), having the following chemical structure:

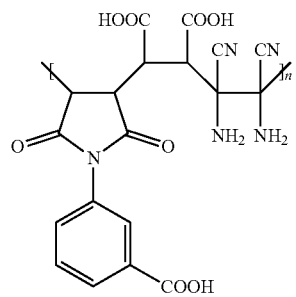

where n is an integer from 1 to about 25,000.

Figure 4:
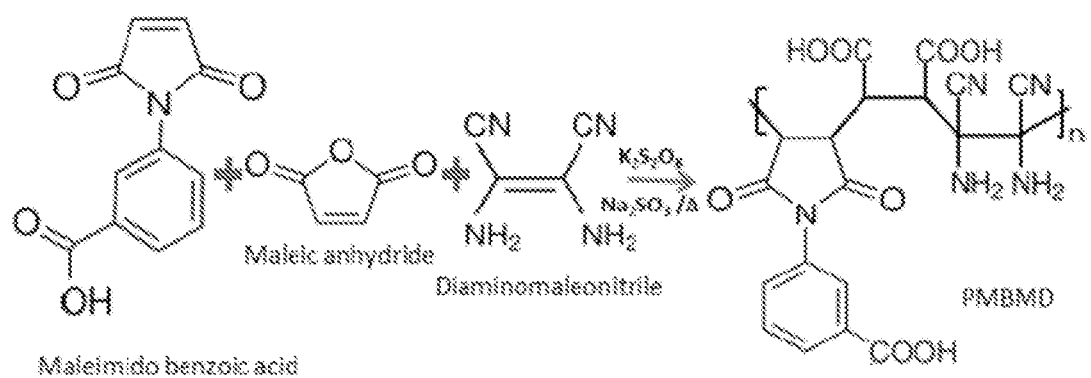
FIG. 4 is a schematic illustration of the synthesis of the hydrophilic poly(maleimide benzoic acid-co-maleic acid-co-diaminomaleonitrile) (PMBMD) polymer of the present invention.

FIG. 4 shows the synthesis scheme of the PMBMD polymer in accordance with an embodiment of the present invention. In this embodiment, the PMBMD polymer is synthesized by reacting maleimide benzoic acid with maleic anhydride and diaminomaleonitrile. Any suitable reaction conditions may be employed in the synthesis of the PMBMD polymer. In one embodiment, the reaction condition may include reacting maleimide benzoic acid with maleic anhydride and diaminomaleonitrile in the presence of potassium persulfate and sodium sulfite, at a temperature between 25° C. to 50° C.

The polymer of the present invention has super hydrophilicity. This means that the polymer has surfaces which exhibit a wetting contact angle between 5° and 50°. This contact angle is lower than the contact angle of a polymer without zwitterionic property. Hydrophilic property increases as water contact angle decreases. For the purpose of this application, the terms "hydrophilic" and "super hydrophilic" are used interchangeably.

The super hydrophilic property of the polymer of the present invention is attributed to the negatively charged carboxylic and positively charged amine functional groups in the backbone of the polymer. These groups increase the hydrophilicity as well as to provide zwitterionic property to the membranes fabricate from the polymer. Chemically and thermally stable imide and aromatic ring structures are also incorporated in the backbone of the polymer to provide stability to the polymer.

The hydrophilic polymer of the present invention can be used as a coating or as an additive. As a coating, the polymer can be applied onto the surface of a membrane. As an additive, the polymer can be added to a casting solution for use in fabricating single-layer membrane.

In another aspect of the invention, a hydrophilic polymer-based membrane for oil-water separation is provided. The membrane comprises a layer formed of the polymer as described hereinabove. In particular, the membrane comprises a base polymer; and a second polymer comprising polymer repeat units, each unit having at least one negatively charged carboxylic functional group and at least one positively charged amine functional group, and a monomer having a single aromatic ring and an imide functional group.

In one embodiment, the membrane is a single-layer membrane. In another embodiment, the membrane is a multilayer membrane. In this embodiment, the base polymer and the second polymer form a single-layer of material and the single-layer of material forms a coating over a porous base substrate. The porous base substrate can be any suitable membrane substrate including, but not limited to, polyethersulfone (PES), poly(acrylonitrile-co-maleic anhydride), cellulose acetate, polyamide, polyimide, poly(amide-imides), polysulfone, polypropylene, polyester, polyvinylidene fluoride (PVDF), copolymers and blends thereof and combination thereof.

In one embodiment, the polymer repeat unit has a general formula of:

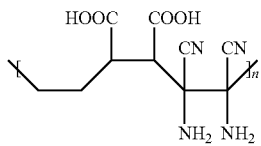

where n is an integer from 1 to about 25,000.

In one embodiment, the monomer is maleimido benzoic acid having the following structure:

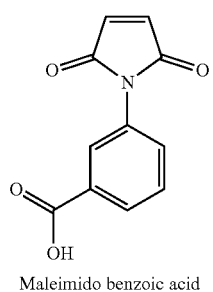 [SMILES: O=C(O)c1cccc(N2C(=O)C=CC2=O)c1]

Maleimido benzoic acid

Preferably, the hydrophilic polymer used in the fabrication of the membrane comprises polymer repeat units in an amount of 30-50% by weight based on the total weight of the hydrophilic polymer.

In one embodiment, the hydrophilic polymer-based membrane of the present invention is fabricated from poly (maleimide benzoic acid-co-maleic acid-co-diaminomaleonitrile) (PMBMD) polymer, having the following chemical structure:

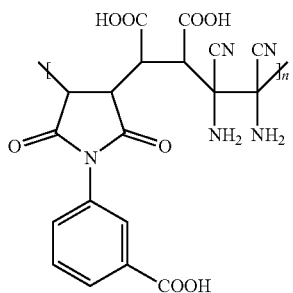

where n is an integer from 1 to 25,000.

Preferably, the hydrophilic polymer-based membrane of the present invention has a surface water contact angle between 5° and 50°. The membrane has an average pore size of 18 to 22 nm. The thickness of the membrane ranges from 90 to 130 μm. The membrane has a tensile strength of 4 to 5N.

In one embodiment, the hydrophilic polymer-based membrane of the present invention is an ultrafiltration membrane, for use in ultrafiltration of oil-in-water emulsions. The membrane has high oil-emulsion in water rejection of more than 98%.

The hydrophilic polymer-based membrane of the present invention has several advantages over conventional polymeric membranes. One of which is that no additives need to be added to the membrane of the present invention to enhance the hydrophilicity of the membrane since the membrane already possess super hydrophilic and anti-fouling properties. Under harsh operating conditions and cleanings, the flux of the membrane will not decline over time. The membrane of the present invention is fabricated from chemically and thermally stable co-polymer with zwitterionic surface property. Zwitterions are neutral compounds that have formal unit electrical charges of opposite sign (that is, the positive and negative electrical charges). The presence of zwitterions in the membrane increases the hydrophilicity of the membrane and reduces protein adsorption on the membrane surface. Zwitterionic surface that contains uniform chains of hydrophilic molecules with tailorable length can bind more water by hydrogen bonding, leading to a strong repulsive force to protein molecules at specific separation distances.

Hydrophilicity of a membrane is considered an important determinant of membrane fouling susceptibility. Hydrophilic surfaces are proven to strongly adsorb a layer of water molecules, establishing a buffer which prevents or minimizes adhesion of foulants to the membrane surface. As mentioned above, the membrane of the present invention has super hydrophilic and anti-fouling properties. The test results obtained show that the membrane of the present invention is able to treat complex simulated produced water of up to 87% flux improvement when compared to conventional membranes without such functionalization. In addition, the membrane of the present invention can also achieve a 98% total organic carbon (TOC) rejection, 92% chemical oxygen demand (COD) reduction, 99.5% total suspended solids (TSS) removal and a flux recovery of about 90%.

A method of producing the hydrophilic polymer-based membrane of the present invention is described hereinabove.

The method comprises dissolving a monomer comprising a single aromatic ring and an imide functional group, and a mixture containing maleic anhydride and diaminomaleonitrile in a solvent to obtain a solution; and thermal imidizing the solution to form a hydrophilic polymer for use in fabricating a hydrophilic polymer-based membrane with zwitterionic property.

In one embodiment, the monomer is maleimido benzoic acid. In this embodiment, the method comprises reacting 3-aminobenzoic acid with maleic anhydride to obtain a solution and subjecting the solution to thermal imidization or chemical imidization to obtain the maleimide benzoic acid. The molar ratio of 3-aminobenzoic acid to maleic anhydride is 1:1.

In one embodiment, the hydrophilic polymer is poly (maleimide benzoic acid-co-maleic acid-co-diaminomaleonitrile) (PMBMD), having the following chemical structure:

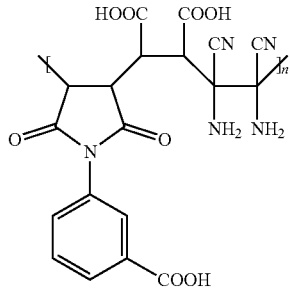

where n is an integer from 1 to 25,000.

The method further comprises adding the hydrophilic polymer to a casting solution and mixing the solution to obtain a homogeneous polymeric solution.

Any suitable casting solution may be used without departing from the scope of the present invention. The casting solution can be formed by any conventional method capable of forming a solution containing the dissolved hydrophilic polymer in the solvent. In an exemplary embodiment, the casting solution comprises a base polymer, a base solvent, a non-solvent and one or more additives.

Examples of suitable base polymers include, but are not limited to, polyethersulfone (PES), poly(acrylonitrile-co-maleic anhydride, cellulose acetate, polyamide, polyimide, poly(amide-imides), polysulfone, polypropylene, polyester, polyvinylidene fluoride (PVDF), copolymers and blends thereof and combination thereof.

Examples of suitable solvents include, but are not limited to, N,N-dimethyl acetamide (DMAc), dimethylformamide (DMF), N-Methyl-2-pyrrolidone (NMP), dimethyl sulphoxide (DMSO) and acetonitrile.

Suitable non-solvents include, but are not limited to, diethylene glycol (DEG), deionized water, ethanol and methanol.

One or more additives may be added to the casting solution. Examples of additives include, but are not limited to, polyvinylpyrolidone (PVP), polyethylene glycol (PEG), polyethylene oxide (PEO) and inorganic salts.

In one embodiment, the casting solution comprises polyethersulfone (PEG), polyvinylpyrolidone (PVP), diethylene glycol (DEG) and N,N-dimethyl acetamide (DMAc). Preferably, the casting solution comprises 10 to 25 wt % polyethersulfone, 5 to 25 wt % polyvinylpyrolidone, 5 to 25% wt % diethylene glycol and 30 to 70 wt % N,N-dimethyl acetamide.

The casting solution can be made by first mixing one or more additives into the solvent/non-solvent mixture, with any suitable mixing device, then dissolving the base polymer and the hydrophilic polymer of the present invention into the mixture with further mixing to obtain a homogenous polymeric solution. It should be noted that the order of adding each component to form the casting solution is provided by way of example only. The precise order of adding the components does not matter.

The amount of hydrophilic polymer added to the casting solution ranges from 2.5 to 10 wt % based on the total weight of the casting solution.

The homogeneous polymeric solution is then used to fabricate the hydrophilic polymer-based membrane. The hydrophilic polymer-based membrane can be a single-layer membrane or a multilayer membrane. For single-layer membrane, the membrane may be fabricated using phase inversion method, dry wet spinning method or any other suitable methods known in the art. Any suitable types of membrane may be fabricated using the hydrophilic polymer of the present invention including, but not limited to, flat sheet membrane and hollow-fiber membrane.

For multilayer membrane, that method comprises applying a coating of the hydrophilic polymer to a porous base membrane to form a coated porous base membrane.

The membranes made in accordance with the method of the present invention have super hydrophilicity property with zwitterionic property and are useful for effective oil-water separation.

The following examples illustrate various embodiments of this invention. One skilled in the art will recognize that the examples set out below are not an exhaustive list of the embodiments of this invention.

EXAMPLES

Example 1

Fourier Transform Infrared (FTIR) Spectroscopy Analysis (Structural Confirmation)

The structures of the synthesized maleimido benzoic acid monomer and the poly(maleimide benzoic acid-co-maleic acid-co-diaminomaleonitrile) (PMBMD) polymer were confirmed by FTIR spectroscopy.

Figure 5A:
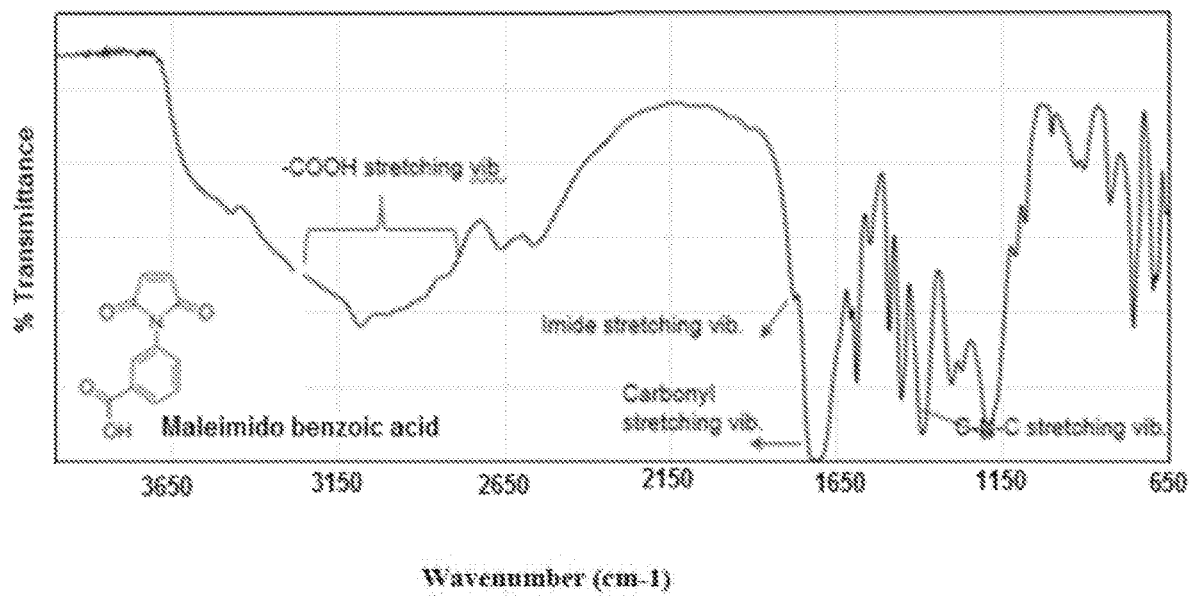
FIG. 5(a) shows a FTIR spectrum of maleimido benzoic acid of the present invention.

FIG. 5a shows the FTIR spectrum of maleimido benzoic acid. The broad stretch around 3150 $cm^{-1}$ corresponds to the acid stretching vibration. A small shoulder peak at 1780 $cm^{-1}$ and a sharp peak at 1700 $cm^{-1}$ correspond to the imide carbonyl stretching vibrations. The C—N—C stretching vibration of the imide group was observed at 1362 $cm^{-1}$. This confirms the formation of maleimido benzoic acid.

Figure 5B:
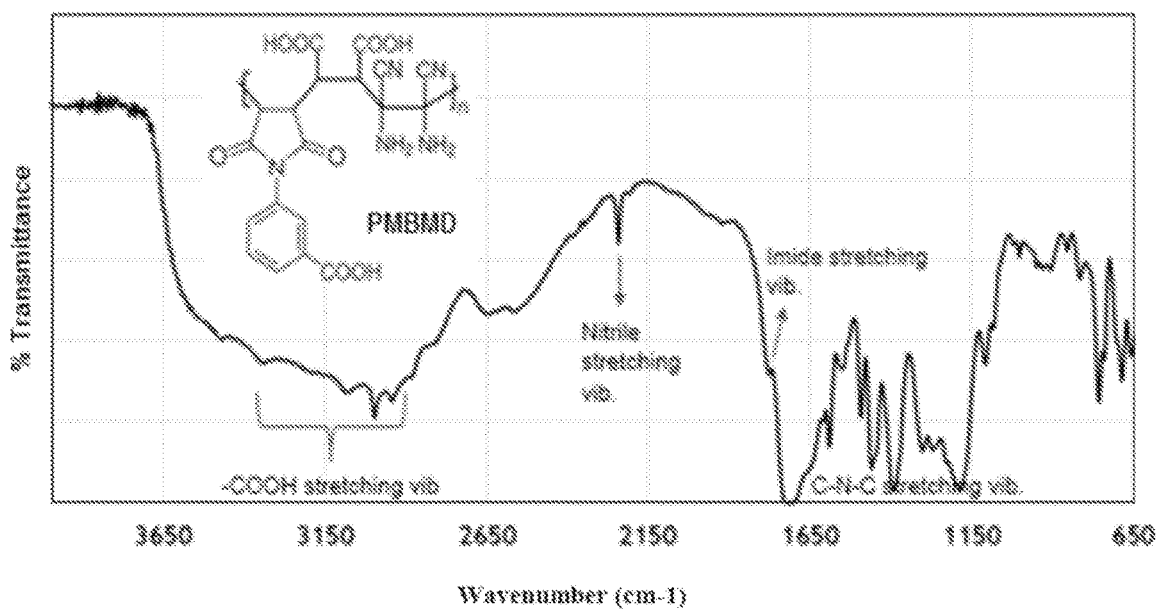
FIG. 5(b) shows a FTIR spectrum of the PMBMD polymer of the present invention.

FIG. 5b shows the FTIR spectrum of PMBMD. Similar to maleimido benzoic acid, the broad peak around 3600 $cm^{-1}$ to 3000 $cm^1$ corresponds to the acid carbonyl stretching vibration. A sharp peak around 2241 $cm^{-1}$ corresponds to the nitrile group. The imide carbonyl stretching vibrations are observed at 1779 $cm^{-1}$ and 1720 $cm^{-1}$. The amine stretching vibrations are observed at around 1650 $cm^{-1}$ as a small shoulder overlapped to the imide carbonyl group vibrations. This confirms the formation of PMBMD.

Nuclear Magnetic Resonance (NMR) Spectroscopy

Figure 6:
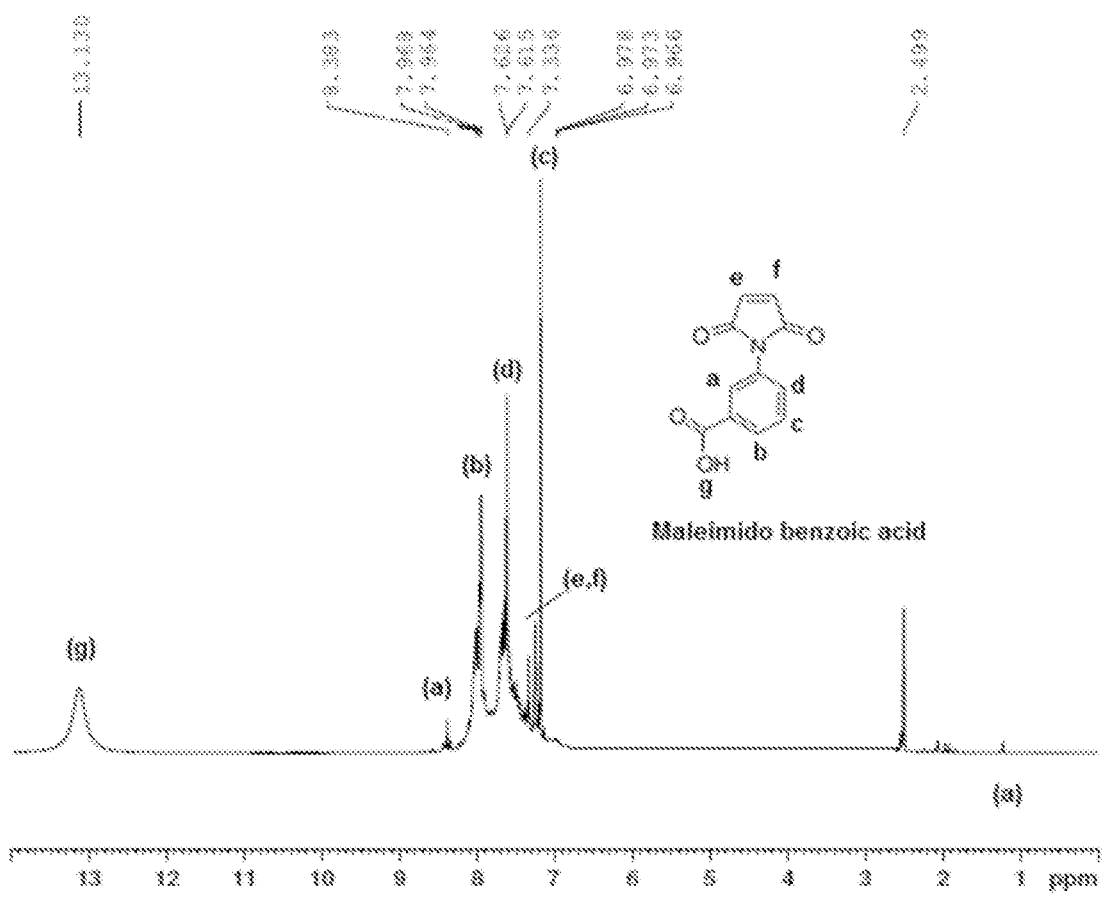
FIG. 6 shows the $H^1$-NMR spectrum of maleimido benzoic acid.

The structure of the maleimido benzoic acid monomer and the PMBMD polymer were further confirmed by NMR spectroscopy. FIG. 6 shows the $H^1$-NMR spectrum of the maleimido benzoic acid monomer in DMSO-d6. It shows a broad peak at 13.16 for the acid (OH) proton. All the other aromatic protons are accounted in the region between 6.96 to 8.36 as shown in FIG. 6.

Figure 7:
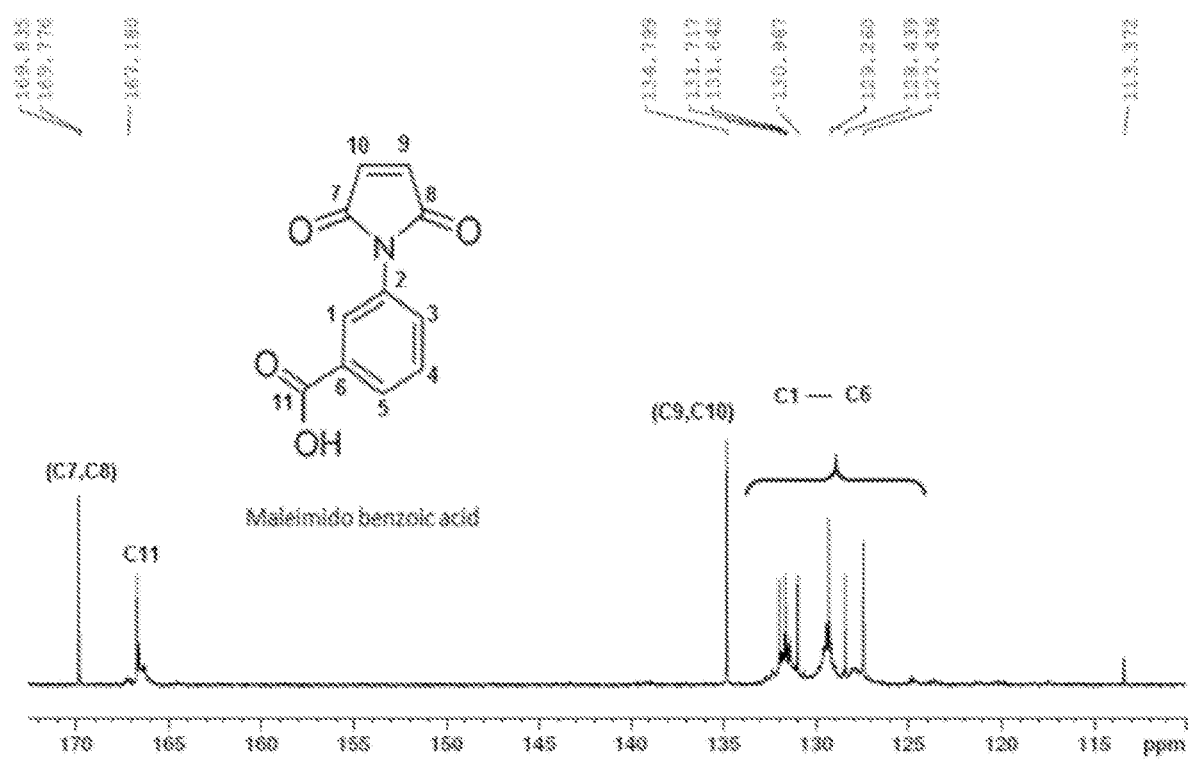
FIG. 7 shows the $C^{13}$-NMR spectrum of maleimido benzoic acid.

FIG. 7 shows the $C^{13}$-NMR spectrum of maleimido benzoic acid. The three peaks at 169.88, 169.78 and 167.18 correspond to the carbonyl carbons. The peak at 134.78 corresponds to the $CH_2$ carbons in the maleimide ring. All the aromatic carbons are accounted in the region between 127.48 and 131.78 as shown in the spectrum in FIG. 7.

Figure 8:
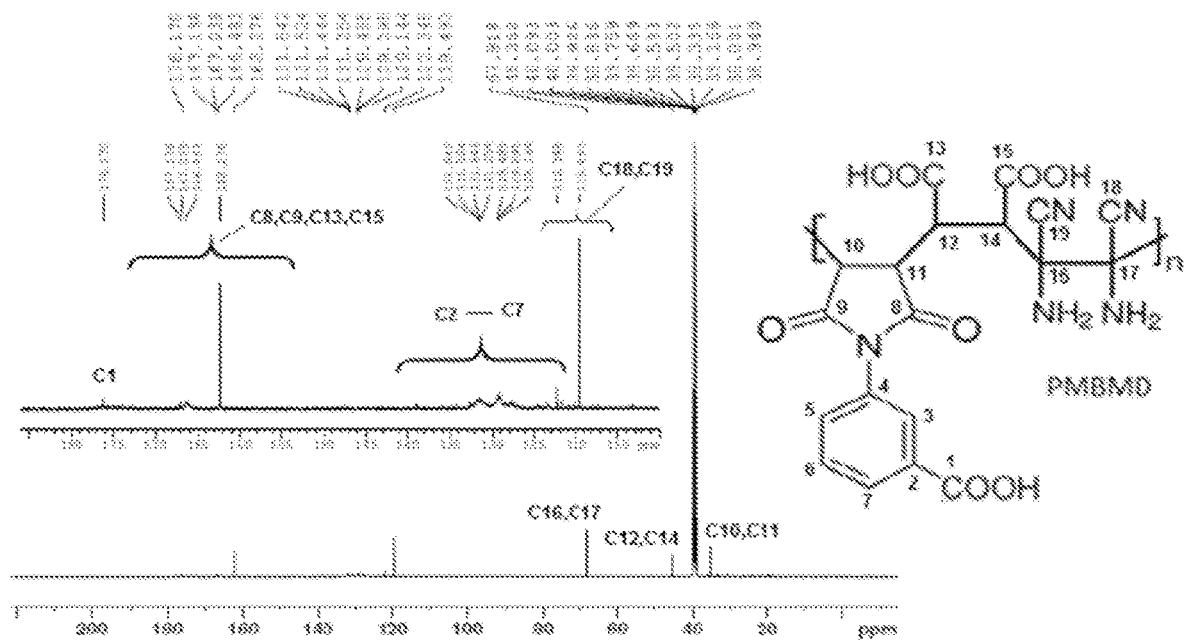
FIG. 8 shows the $C^{13}$-NMR spectrum of the PMBMD polymer in accordance with the present invention.

FIG. 8 shows the $C^{13}$-NMR spectrum of the PMBMD polymer dissolved in DMSO-d6. The peaks in the region between 176.1 ppm and 162.2 ppm correspond to the carbonyl carbons. The peaks at 67.9 ppm, 45.3 ppm and 38.9 ppm correspond to the $CH_2$ carbons in the polymer backbone. All the aromatic carbons are accounted in the region between 131.6 ppm and 129 ppm. The nitrile carbons exhibited peaks at 122 ppm and 119 ppm as shown in the spectrum in FIG. 8.

Gel Permeation Chromatography (GPC)

Figure 9:
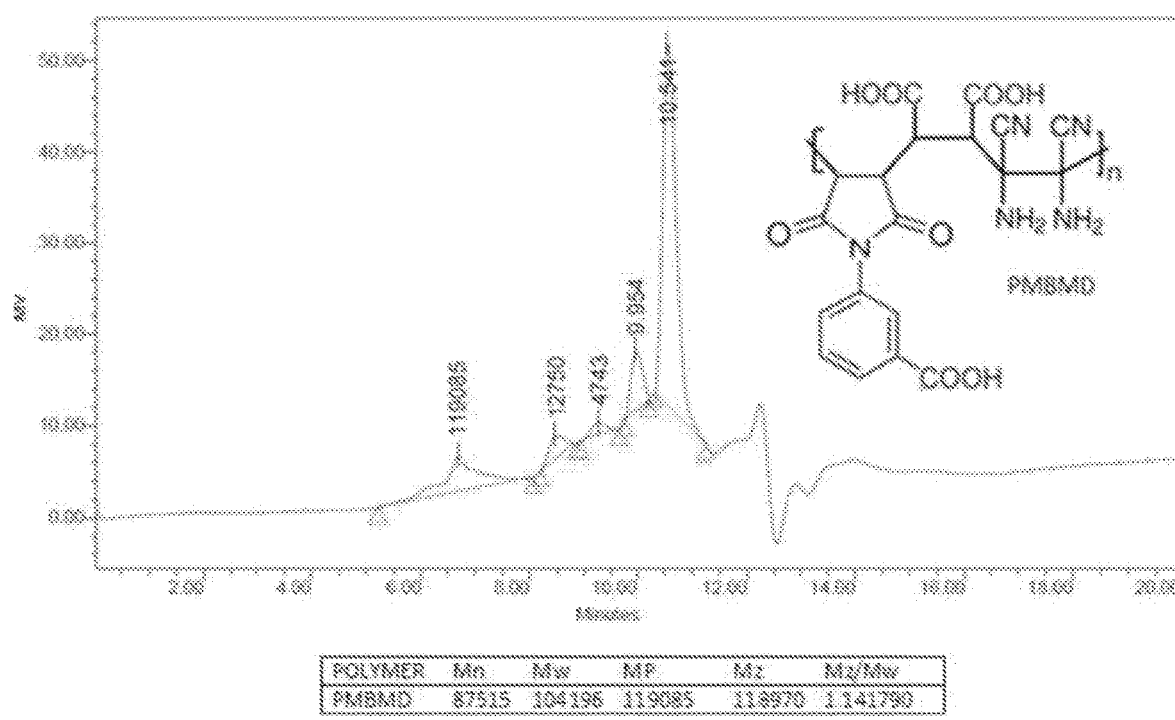
FIG. 9 shows the molecular weight distribution of the PMBMD polymer according to the present invention.

The molecular weight (Mw) and the molecular weight distribution of the synthesized PMBMD with respect to polystyrene standards was measured using gel permeation chromatography. The results obtained are as shown in FIG. 9. From the analysis, the molecular weight of the polymer was found to be around 104,196 g/mol. The average molecular weight was around 87,515. The polydispersity index (Mw/Mn) was calculated to be 1.19. This analysis confirms the high molecular weight of the synthesized polymer with controlled polymer width.

Example 2

Fabrication of PMBMD-Based Flat Sheet Ultrafiltration Membranes

The PMBMD-based ultrafiltration membranes were prepared using simple phase inversion method. Poly(acrylonitrile-co-maleic anhydride (PANCMA)/polyethersulfone (PES) was used as the base polymer. N,N-dimethyl acetamide (DMAc) was used as the base solvent, diethylene glycol (DEG) was used as a non-solvent and polyvinylpyrolidone (PVP) was used as an additive (pore forming agent).

The composition of the casting solution consisted of 19-21 wt % PES, 5 wt % polyvinylpyrolidone (PVP-K-30), 5 wt % diethylene glycol (DEG), and 69 wt % DMAc respectively. PMBMD concentration in the dope solution varied from 2.5 to 10 wt %.

PVP powder was first added into the DMAc/DEG mixture in a round bottomed flask and the solution was stirred by a mechanical stirrer for at least 1 to 1.5 hours. After complete dissolution of PVP, PES (for control membrane) and PES/PMBMD (for modified membrane) were added, and the mixture was stirred at a constant speed of 250 to 350 rpm for at least 24 hrs at 80° C., to obtain a homogeneous dope solution.

The homogeneous dope solution was used to fabricate ultrafiltration membrane using phase inversion method. The prepared membranes were immersed into a post treatment solution comprising 60% water and 40% glycerin before the membranes were tested for clean water flux. The set thickness of the membrane was 125 μm and the actual thickness of the membrane after drying was measured to be 100±10 μm.

Characterization of the Developed Flat Sheet Membranes

FESEM Studies

Figure 10:
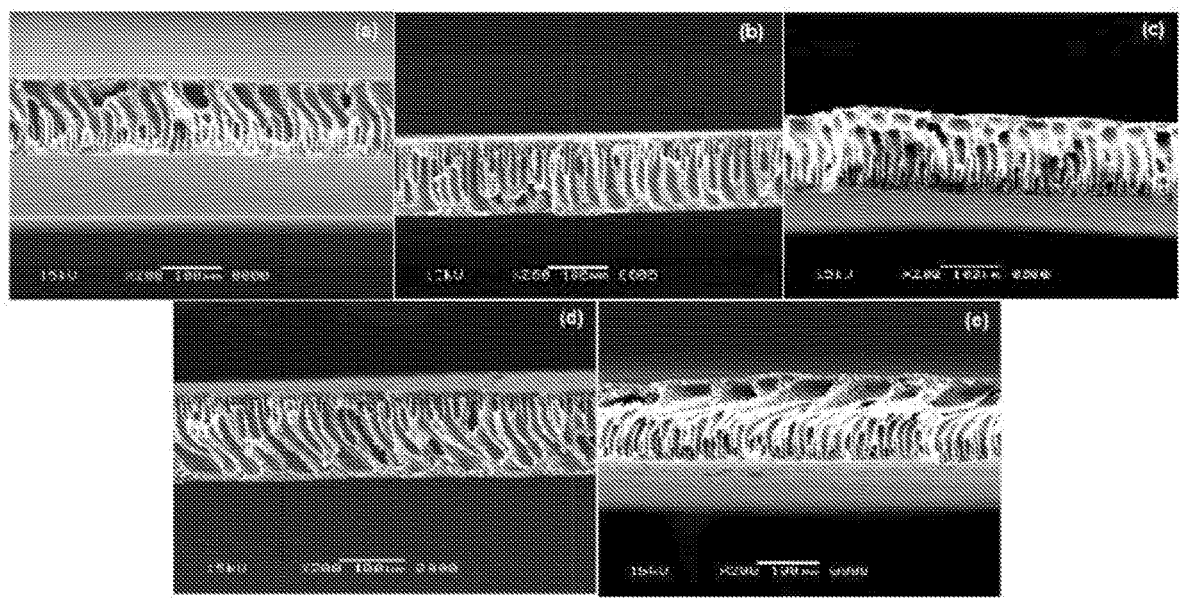
FIG. 10 shows the FESEM images of (a) control PES membrane; (b) PES membrane with 2.5% additive; (c) PES membrane with 5% additive; (d) PES membrane with 7.5% additive; and (e) PES membrane with 10% additive.

The morphology of the control and the modified membranes were characterized using field emission scanning electron microscopy (FESEM). The samples were sputter coated with platinum, using a JFC-1600 auto fine coater (JOEL, Tokyo Japan) and the morphology of the membranes was observed. FIG. 10 shows the FESEM images of the control PES and PES membrane with varying PMBMD concentration. It can be seen that the modified membranes have smaller and evenly distributed finger-like structures as compared to that of the control membrane. This is attributed to the addition of PMBMD in the PES matrix.

Water Contact Angle (CAw)

The water contact angles (CAw) of the control and modified PES membranes were determined using the VCA Optima Surface Analysis System (AST Products, Inc., Billerica, Mass., USA) to investigate the effect of adding the polymer additive on the surface property of the PES membrane. The membrane samples were each placed on the glass sample plate and fixed with tape. The equipment syringe filled with distilled water was installed to stand vertically, after which a water droplet was deposited on the membrane surface. The CAw was measured at five different points on each sample.

It was found that the addition of polymeric additive increases the hydrophilic property of the PES membranes by decreasing the water contact angle of the PES membranes. As the concentration of the additive increases, the hydrophilic property of the membranes also increases. It was noted that the water contact angle of PES membrane decreases with the increase in wt % of PMBMD and a minimum of 290 was achieved for the membrane with 7.5 wt % PMBMD. This is about 46% lower as compared to the control membrane. The results obtained are shown in Table 1.

TABLE 1

Water contact angles of the control and modified PES membranes

| Sample | Contact Angle (°) |
| --- | --- |
| Control | 54.37 |
| PES +2.5% additive | 50.40 |
| PES +5.0% additive | 31.43 |
| PES +7.5% additive | 29.02 |
| PES +10% additive | 44.00 |

Clean Water Flux

The pure water permeability (PWP) of the control PES and the modified membrane was measured using cross-flow filtration system. A membrane with the total effective membrane area of 120 $cm^2$ (8 cm×20 cm) was used to fabricate the membrane module. The developed membrane module was mounted into the filtration system. Cross-flow ultrafiltration experiments were carried out at 1 bar feed pressure. The permeation was collected in a beaker mounted on an electronic balance. After compaction, the pure water flux (Jw) was determined. The filtration experiment was repeated for 3 times with 3 membrane samples and the average readings of each sample were taken and as shown has been reported in Table 2.

TABLE 2

Pure water permeability of the control
and modified PES membranes

| Sample | PWP (LMH/bar) |
|---|---|
| Control | 385.2 |
| PES +2.5% additive | 507.7 |
| PES +5.0% additive | 632.1 |
| PES +7.5% additive | 710.5 |
| PES +10% additive | 658.2 |

The above table shows the clean water flux for the membranes at a constant feed water pressure of 1 bar. All the membranes were tested under similar conditions. It was noted that the modified membranes gave higher flux compared to the control membrane. This is due to their increased porosity, smaller pore size and increased hydrophilicity (decrease in contact angle). Also, it was noticed that as the concentration of polymer additive increased, the water flux increased significantly by up to 85%. This is due to the increased hydrophilic nature of the membranes.

Example 3

Preparation of PMBMD-Based Hollow Fiber Membranes by Dry Wet Spinning

The PES hollow fiber membranes were prepared using dry wet spinning method. PES was used as the base polymer, DMAC was used as the base solvent, deionized water was used as a non-solvent and two additives, PVP-K-30 was used as the pore forming agent and hydrophilic PEG were used to improve the surface property of the membrane. The composition of the casting solution consisted of 21 wt % PES, 5 wt % PVP-K-30, 5 wt % DEG, 69% DMAc.

For the modified membrane, based on the results obtained with flat sheet, 5 wt % PMBMD was blended with the above described dope solution. PVP powder was first added into the DMAc/DEG mixture in a round bottom flask and the solution was stirred by a mechanical stirrer for at least 1 hour. After complete dissolution of PVP, PMBMD and PES were added and the mixture was allowed to stir at a constant speed of 250 to 350 rpm for at least 24 hours at 80° C., to obtain a completely dissolved homogeneous polymeric solution. The dope solution was poured into the polymer tank and degassed at a vacuum pressure of −0.6 bar for 20 minutes. Nitrogen gas was purged into the dope tank to create an inert atmosphere and to push the polymer to the polymer pump. DMAc and water were mixed in 80:20 volume ratio and the mixture was poured into the bore liquid tank. The polymer solution and the bore liquid were pumped to the spinneret (OD 1.2 mm, ID 0.6 mm). The air gap was fixed at 20 mm. The hollow fiber membranes were fabricated at around 25° C. and at around 65% relative humidity with a take up speed of 8 Hz. The membrane turned opaque soon after coming into contact with water which indicates the coagulation and precipitation of PES from the solution. Finally, a translucent, white hollow fiber membrane was formed. The membrane was then collected from the winder and left inside a water tank (post coagulation tank) for a minimum of 24 hours to washout the residual DMAc, DEG and PVP that was not removed from the solution at the point of coagulation. All the prepared membranes were immersed into a post treatment solution of 40% ethanol and 60% glycerin before clean water flux of the membranes were tested.

Characterisation of PMBMD-Based Membranes
Morphology

Figure 11:
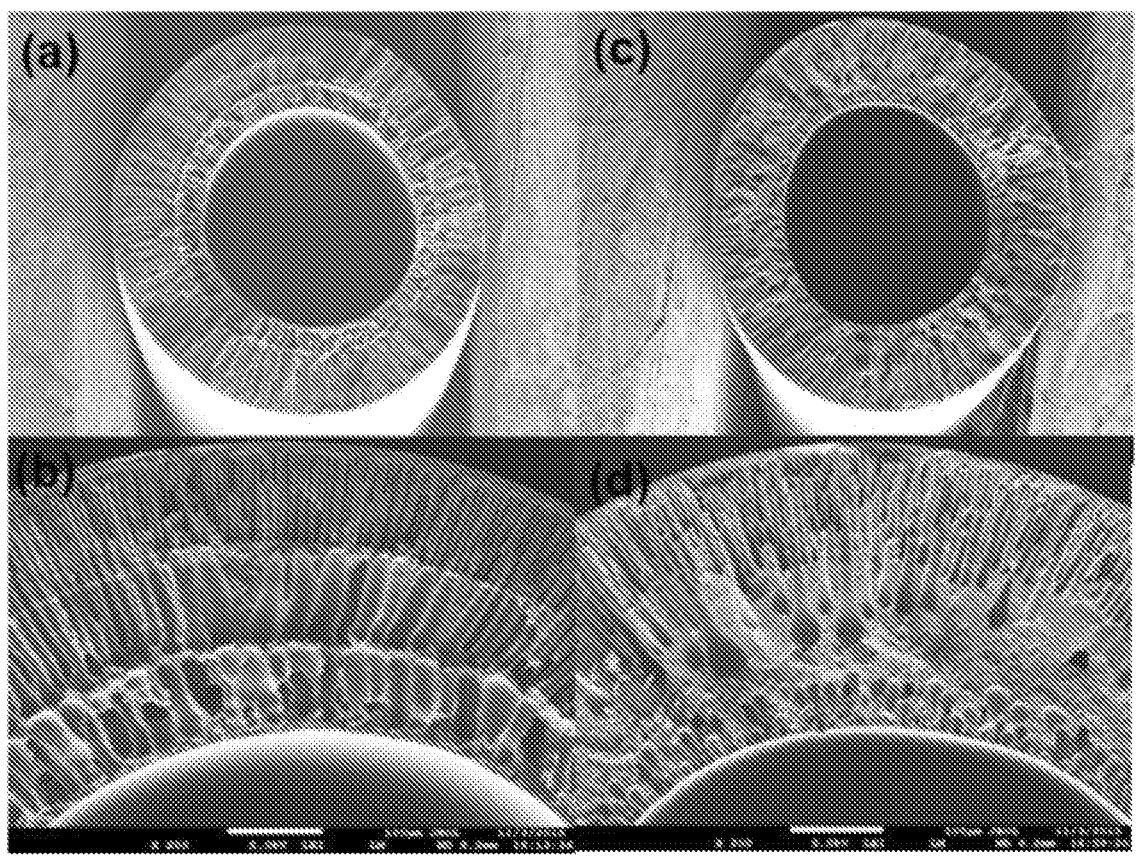
FIG. 11 shows the cross-section SEM image of the PMBMD-based PES membrane.

The hollow fibre membranes fabricated through dry-wet spinning process had an average inner diameter of 0.8 mm and an outer diameter of 1.4 mm. The cross-section of the control and the modified hollow fibre membrane was examined using SEM. The micrograph is shown in FIG. 11. The micrograph shows the presence of well-defined finger-like internal morphology in the control membrane whereas, the modified membrane shows a sponge-like internal structure.

The other basic properties such as contact angle, pore size, PWP, tensile strength and PEO-100K rejection were studied in comparison with the control PES membranes and the results obtained are tabulated in Table 3 below.

TABLE 3

Properties of control and modified membrane

| Properties | Control (PES) | Modified (PMBMD) |
|---|---|---|
| Contact angle (o) | 67 | 41.7 |
| Pore size (nm) | | 20 |
| Tensile strength (N) | 3.05 | 3.05 |
| PWP (LMH) | 290 | 318 |
| Rejection (%) | 51 | 58 |

It was observed that, the incorporation of 5 wt % of PMBMD has improved the hydrophilicity of the membrane by about 60%. The contact angle for the modified membrane was found to be 41.7. This is about 60% lower compared to the control membrane. Similarly, the PWP of the modified membrane was found to be 318 LMH, which is about 10% higher than the control membrane.

Module Development

In order to evaluate the performance of membranes for longer duration, membrane modules (1.5 inch diameter×0.5 m length) were developed for control and the modified membranes. The effective surface area of the developed modules was calculated to be 0.29 to 0.31 m². The pure water permeability of the developed membrane modules were found to be 362 LMH and 402 LMH for the control and modified membranes respectively.

Figure 12:
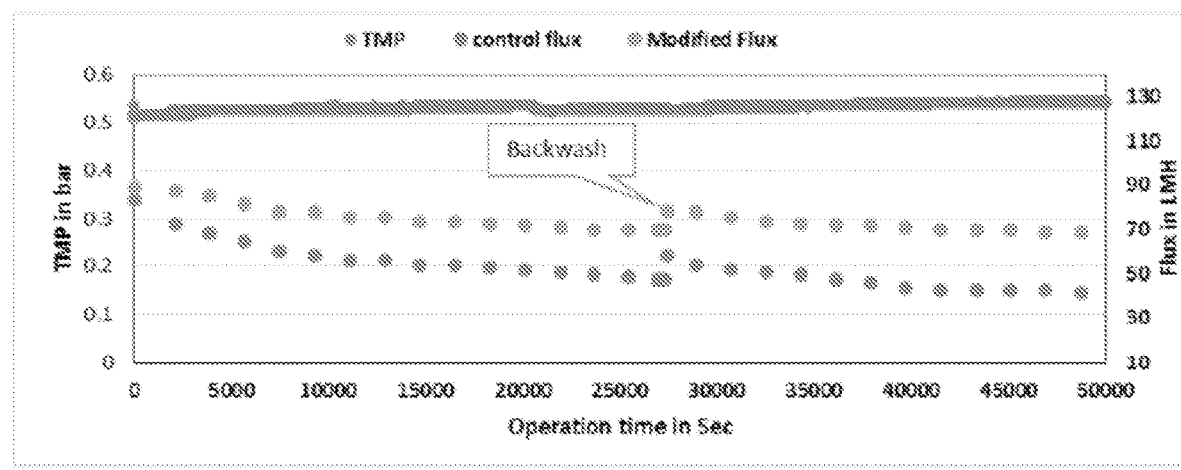
FIG. 12 shows the filtration performance of the modified membrane in comparison with the control PES membrane.

To evaluate the performance of the prepared membranes in oil-water separation, a long time (19 hours) cross-flow ultrafiltration test was carried out using 100 ppm oil (oil emulsion) in deionized water. Fixed criteria's of TMP-0.5 bar and flux around 90 to 130 LMH was used for the experiments. All the tests (3 cycles) were performed without any chemical cleaning steps in between each filtration cycle to observe the base character of the membranes. Flux recovery study was carried out after each filtration cycle modules were backwashed using 1.3 times of permeate water. The results obtained are shown in FIG. 12.

TABLE 4

Performance of control and modified membranes

| | Control | | | Modified | | |
|---|---|---|---|---|---|---|
| No of Cycle | Initial Flux in LMH | Final Flux in LMH | Flux drop % | Initial Flux in LMH | Final Flux in LMH | Flux drop % |
| 1st cyc 7 hrs | 83 | 48 | 42.16 | 89 | 70 | 21.34 |
| 2nd Cyc 7 hrs | 58 | 41 | 29.31 | 78 | 68 | 12.82 |

From FIG. 12, it can be observed that, after each backwash, modified membrane module has 87% flux recovery whereas the control module has only 70%. This shows that the modified membranes have lower fouling tendency.

From Table 4, it can be observed that the flux drop for the modified membranes is significantly lower than that of the control PES membrane. This indicates the fact that, incorporation of PMBMD in PES matrix has improved the hydrophilicity and anti-fouling efficiency of the membrane.

The performance of the membrane in terms of the TOC rejection and COD reduction was also studied by calculating the difference in TOC and COD between the feed and the permeate. The results obtained are tabulated in Table 5 below.

TABLE 5

Contaminant rejection efficiency of the control and modified membranes

| Water quality | Feed water | Permeate water | | % of Rejection | |
|---|---|---|---|---|---|
| | | Control | Modified | Control | Modified |
| TOC (ppm) | 67 | 16 | 12 | 76% | 82% |
| COD mg/l | 201 | 43 | 16 | 78% | 92% |

The results suggest that the performance of the modified membranes in terms of TOC and COD reduction is much better than the control membrane.

The above is a description of the subject matter the inventors regard as the invention and is believed that those skilled in the art can and will design alternative embodiments that include of this invention as set forth in the following claims.

The invention claimed is:

1. A hydrophilic polymer for membrane comprising:
    polymer repeat units, each unit having at least one negatively charged carboxylic functional group and at least one positively charged amine functional group; and
    a monomer having a single aromatic ring and an imide functional group.

2. The hydrophilic polymer according to claim 1, wherein the monomer is maleimido benzoic acid.

3. The hydrophilic polymer according to claim 2, wherein the polymer repeat units having the general formula of:

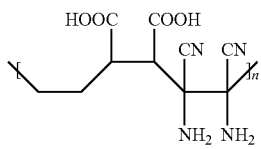

wherein n is an integer from 1 to about 25,000.

4. The hydrophilic polymer according to claim 3, wherein the hydrophilic polymer is poly(maleimide benzoic acid-co-maleic acid-co-diaminomaleonitrile) having the formula:

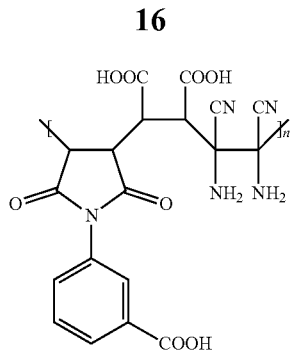

wherein n is an integer from 1 to about 25,000.

5. The hydrophilic polymer according to claim 1, wherein the polymer repeat units constitute 30-50% by weight of the hydrophilic polymer with zwitterionic property.

6. A hydrophilic polymer-based membrane for oil-water separation, the membrane comprising:
    a base polymer; and
    a second polymer comprising polymer repeat units, each unit having at least one negatively charged carboxylic functional group and at least one positively charged amine functional group, and a monomer having a single aromatic ring and an imide functional group.

7. The hydrophilic polymer-based membrane according to claim 6, wherein the membrane is a single-layer membrane.

8. The hydrophilic polymer-based membrane according to claim 6, wherein the membrane is a multilayer membrane with the second polymer forming a coating over the base polymer.

9. The hydrophilic polymer-based membrane according to claim 6, wherein the monomer is maleimido benzoic acid.

10. The hydrophilic polymer-based membrane according to claim 9, wherein the polymer repeat units are obtainable by reacting maleic anhydride with diaminomaleonitrile and having the general formula of:

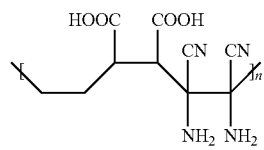

wherein n is an integer from 1 to about 25,000.

11. The hydrophilic polymer-based membrane according to claim 10, wherein the second polymer is poly(maleimide benzoic acid-co-maleic acid-co-diaminomaleonitrile) having the formula:

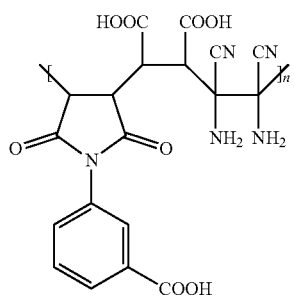

wherein n is an integer from 1 to about 25,000.

12. The hydrophilic polymer-based membrane according to claim 6, wherein the base polymer is selected from the group consisting of polyethersulfone, poly(acrylonitrile-co-maleic anhydride, cellulose acetate, polyamide, polyimide, poly(amide-imides), polysulfone, polypropylene, polyester, polyvinylidene fluoride, copolymers and blends thereof and combination thereof.

13. The hydrophilic polymer-based membrane according to claim 6, wherein the membrane has a surface water contact angle between 5° and 50°.

14. The hydrophilic polymer-based membrane according to claim 6, wherein the membrane has an average pore size of 18 to 22 nm.

15. The hydrophilic polymer-based membrane according to claim 6, wherein the membrane has a thickness of 90 to 130 μm.

16. The hydrophilic polymer-based membrane according to claim 6, wherein the polymer repeat units constitute 30-50% by weight of the hydrophilic polymer with zwitterionic property.

17. The hydrophilic polymer-based membrane according to claim 6, wherein the membrane is an ultrafiltration membrane.

\* \* \* \* \*